Dec. 14, 1943.                W. M. ANDERSON                2,336,915
                        SELF-LUBRICATING BEARING OR AXLE
                   Filed Nov. 10, 1941            3 Sheets-Sheet 1

INVENTOR
William M. Anderson
BY Oscar W. Giese
           ATTORNEY

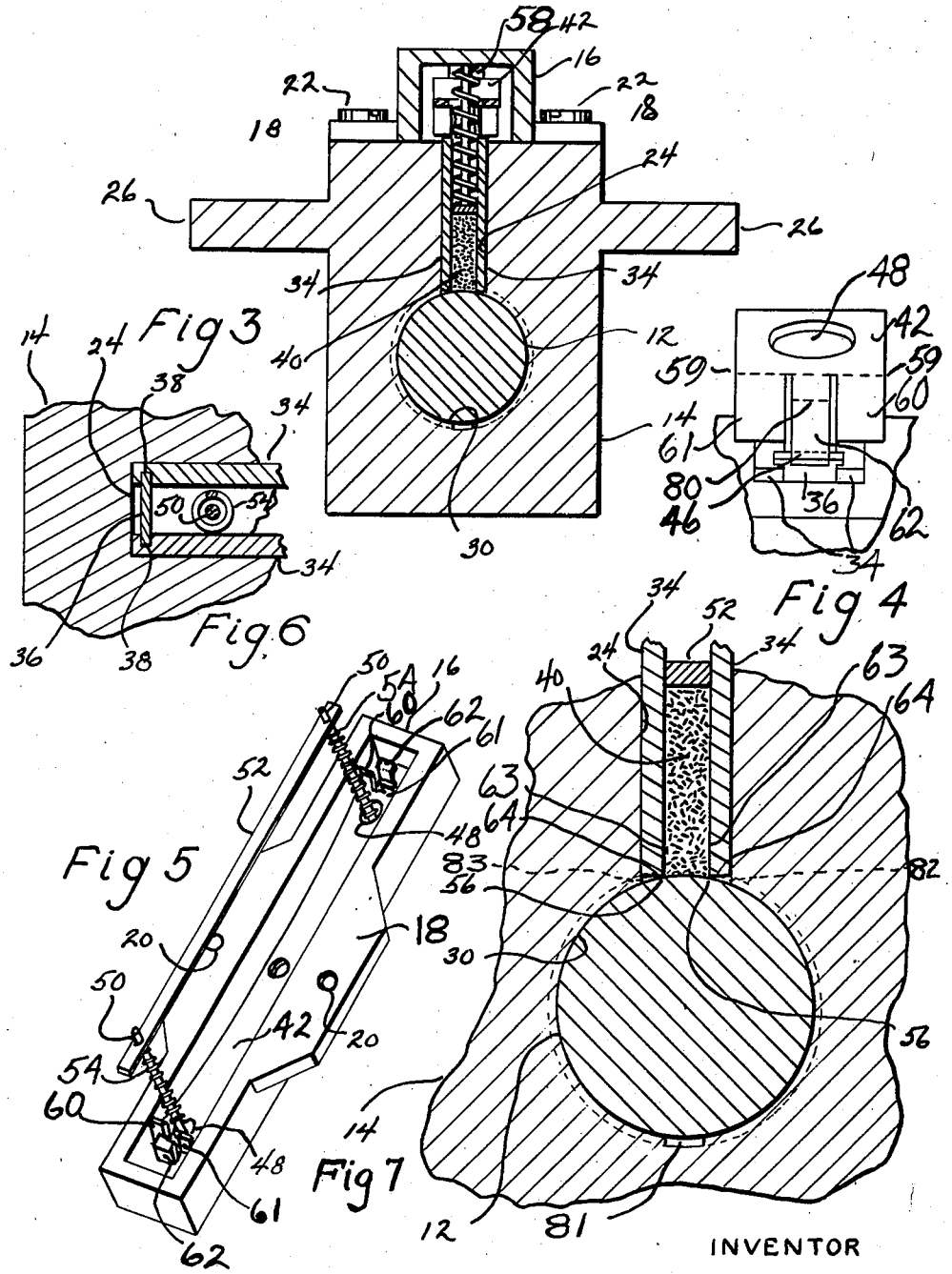

Dec. 14, 1943. W. M. ANDERSON 2,336,915
SELF-LUBRICATING BEARING OR AXLE
Filed Nov. 10, 1941 3 Sheets-Sheet 3
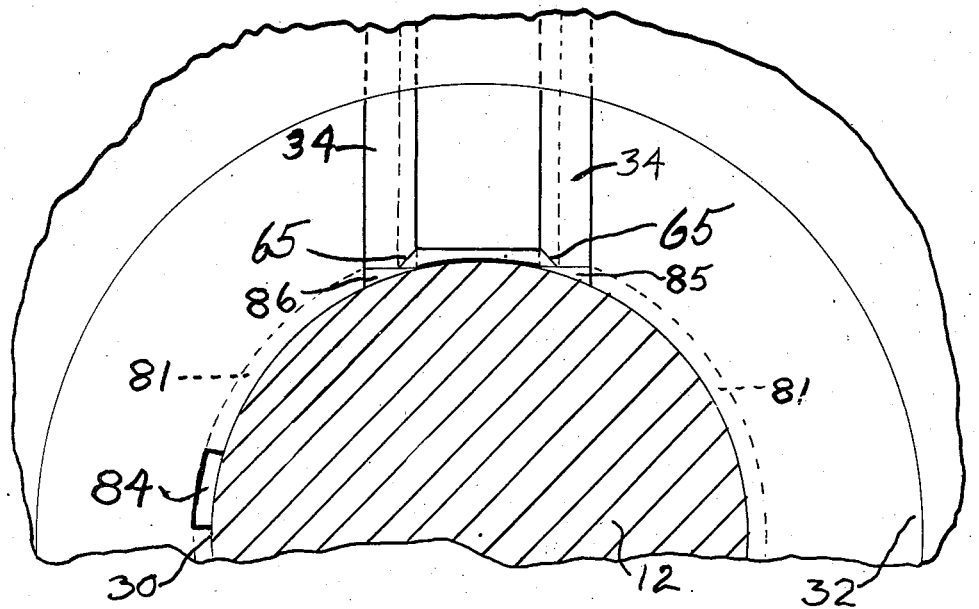
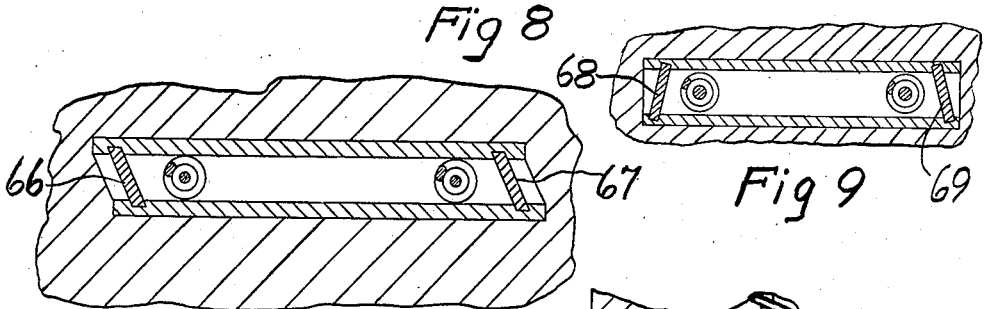
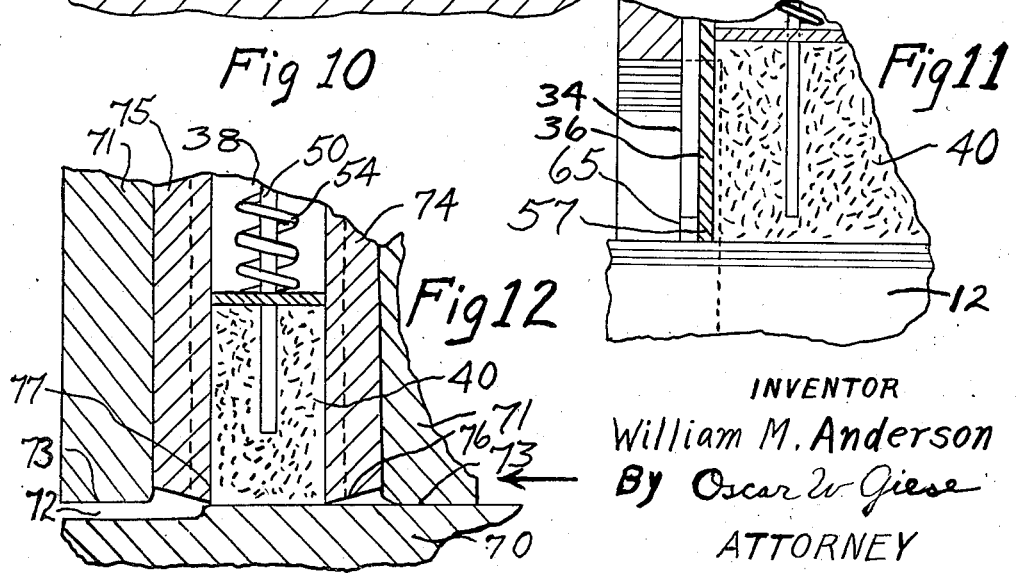
INVENTOR
William M. Anderson
By Oscar W. Giese
ATTORNEY Patented Dec. 14, 1943

2,336,915

UNITED STATES PATENT OFFICE 2,336,915

SELF-LUBRICATING BEARING OR AXLE

William M. Anderson, Minneapolis, Minn., assignor of one-third to Oscar W. Giese, Minneapolis, and one-third to Maurice H. Graham, St. Louis Park, Minn.

Application November 10, 1941, Serial No. 418,467

15 Claims. (Cl. 308—124)

The present invention relates to a bearing assembly and method for lubrication thereof. It has for a broad object to provide a self-lubricating bearing which may utilize solid or semi-solid lubricants of that class which has high resistance to heat and low coefficient of friction, but which has the characteristic of building up on the portions of the shaft and bearing which are subjected to the greatest pressure.

It is another object to provide a self-lubricated bearing assembly with means for preventing an undesirable build-up of lubricant on localized areas of the bearing.

It is another object of the invention to provide an even and continuous lubrication of a bearing assembly by means of graphite-like substances without causing the bearing to bind.

It is a further object of the invention to provide a self-lubricating bearing assembly which will perform under drastic physical conditions but which will consume but a very small amount of lubricant.

It is a still further object of my invention to provide a method of dry or semi-dry lubrication which is readily adapted to relatively moving contact surfaces between which it is desired to maintain a substantially constant and small clearance. Moreover, the invention contemplates an improved self-lubricated bearing which may utilize pure granulated graphite or other flaky substance with desirable lubricating properties, such as mica or vermiculite. Hitherto graphite and similar substances have been used for lubrication but their use has been restricted because of inherent physical characteristics. For example, it has been found that 2% of colloidal graphite suspended in oil will give an excellent high temperature lubrication as compared with pure oil. The greater the percentage of graphite in a lubricant the greater will be its resistance to breakdown under high heat and pressure. The graphite, being solid, does not thin out as does the oil with increasing temperature. As a result the lubricating film of graphite will endure practically to the point of failure of the bearing assembly itself.

Though it would seem obvious to increase the percentage of graphite in oil to a very high percentage or even use the pure graphite alone, it has been found that under such conditions the graphite builds up on the spots of contact between the shaft or moving surface and the bearing which are subject to the greatest pressure. Thus, when even infinitely slight imperfections on the surface of the shaft or bearing occur—and such imperfections always are present—the build-up of graphite flakes begins on the higher portions which are subject to the greater pressure. The imperfection is consequently exaggerated and eventually the pressure and accumulation of graphite becomes so great that it breaks away in a solid piece, but probably not before the shaft has become stuck or bound in the bearing. The microscopic plates of graphite, which should slide over one another under ideal conditions of lubrication, are actually rendered cohesive by the pressure and as such effect a wedging action rather than one of lubrication.

Oil, on the other hand, is much more suited to the ever presnt imperfections in a bearing assembly. The oil, being liquid, merely distributes itself over the contours of the surfaces of the bearing and shaft and follows such contours continuously without building up on localized areas. If too great pressure is present in a local area the oil film will fail at that particular spot and the contact surfaces will wear more rapidly until a new oil film can be formed over this area. A liquid lubricant is therefore ideal from the standpoint of self-adjustment, but it is admittedly lacking in resistance to high temperatures and extreme pressures.

The present invention contemplates lubrication with that class of graphite-like lubricants which has the tendency of building-up, but further contemplates suppressing the accumulation of lubricant so that binding or sticking never occurs. Such suppression is accomplished by a substantial line edge in contact under pressure with the surface of a bearing assembly. The line edge accomplishes two purposes: It limits the amount of lubricant which is fed to the bearing assembly and it scrapes the contact surfaces continuously to suppress the build-up of the flaky lubricant in its incipient stage, long before there would be a tendency for the shaft to bind. By the term "scrapes" or "scraping effect" as used throughout my specification, I mean that the line edge levels or burnishes the graphite-like lubricant on the bearing surface and removes the excess lubricant so as to prevent the building up or caking of the said lubricant thereon.

While pure graphite as a lubricant has been successfully employed in a bearing by briquetting graphite with powdered metal, such bearing is limited in its use since the structure itself of the bearing is altered. The present invention contemplates the use of any desirable bearing material, unaltered in structure, which may be run with precision under extreme conditions of heat, speed and pressure.

The means of feeding the lubricant is of the general type well known in the art which broadly consists in pressing a plug of lubricant from within a chamber opening to the contact surfaces of the bearing assembly. Such devices heretofore have utilized flaky lubricants of graphite-like materials but have made no provision for preventing the build-up of such lubricant on the areas under greater pressure.

It has been a further object of my invention to provide a novel double line edge means including a leading line edge and a trailing line edge. Such edges form the opposite walls of the lubricant holder. Further the said edges are arranged in such a manner that relative movement of the contact surface in one direction will cause the excess flaky lubricant on the contact surface to pass substantially under the leading line edge and to be scraped by the trailing line edge. Thus there is effected at the trailing line edge the removal of the excess lubricant which is retained by the lubricant holder until it is fed again to the contact surface through the holder.

Further the said double line edges are so arranged that upon a reversal of the relative direction of movement of the contact surface the previous leading line edge will become the trailing line edge and the previous trailing line edge will in turn become the leading line edge.

The excess flaky lubricant on the contact surface will then in turn pass substantially under the now leading line edge and any excess lubricant will then in turn be removed or suppressed by the scraping effect of the now trailing line edge.

My object in arranging the aforesaid double line edges so as to form opposite sides of the lubricant holder was in order that any lubricant removed by the scraping effect of the trailing line edge would be retained within the said lubricant holder for redistribution subject to the scraping effect of the trailing line edge. Thus such excess lubricant scraped from the contact surface will not tend to build up on the contact surface so as to cause a binding effect.

Further, through the novel arrangement of my double line edge proper lubrication of the bearing will be effected regardless of the relative directional movement of the contact surfaces.

Furthermore, I have provided a bearing of the type described having a novel ventilating means preventing the overheating thereof.

Other objects and advantages of my invention are set forth in the following description, taken with the accompanying drawings, and the novel features thereof are pointed out in the appended claims. The disclosure, however, is illustrative only and I may make changes in detail, especially in matters of shape, size and arrangement of parts within the principle of the invention, to the full extent indicated by the terms in which the appended claims are expressed.

In the drawings:

Figure 3 is a transverse sectional view taken along the line 3—3 of Figure 2 and looking in the direction of the arrows;

Figure 4 is a perspective fragmentary view of one end of the leaf spring showing the spring fingers in engaging relation with the side members and end member of the lubricant holder and with the feeder bar spring and pin removed;

Figure 5 is a perspective view of the top casing in reverse position showing the feeding mechanism together with the leaf spring and the spring fingers at the opposite ends thereof;

Figure 6 shows a fragmentary sectional plan view of one end of the lubricant holder taken along the lines 6—6 of Figure 2 and showing the manner in which the end members are slidably positioned with respect to the side members of the said holder;

Figure 7 is an enlarged fragmentary view of Figure 3 illustrating the holder and axle;

Figure 8 is an enlarged fragmentary end view of the bearing assembly with the shaft in section, taken along the line 8—8 of Figure 2 and looking in the direction of the arrows;

Figure 9 is a longitudinal sectional plan view of a modified form of my lubricant holder;

Figure 10 is a longitudinal sectional plan view of another modified form of my lubricant holder;

Figure 2:
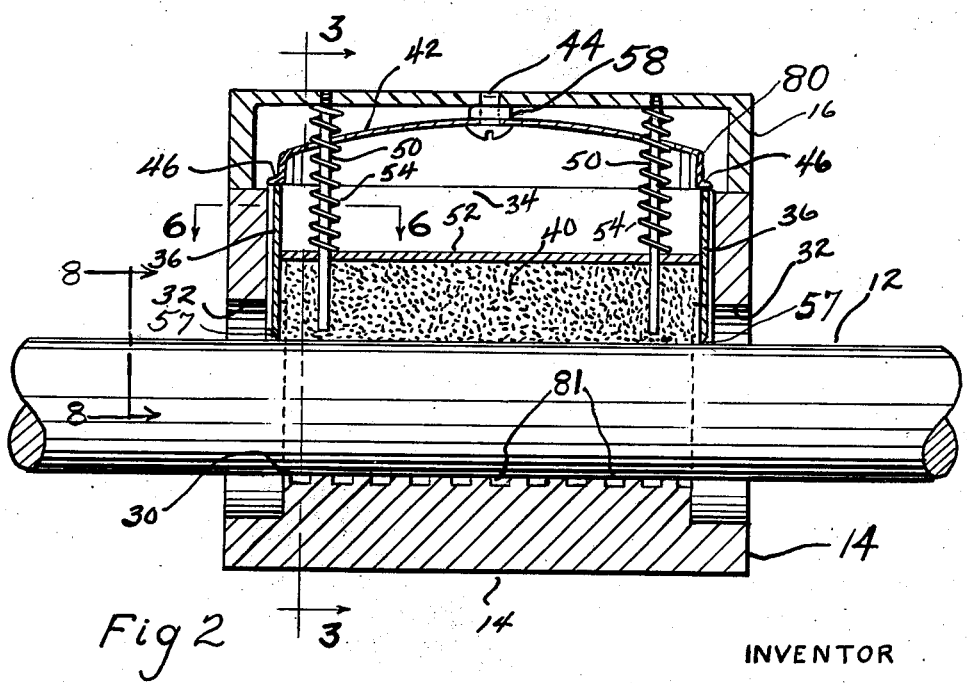
Figure 2 is a vertical longitudinal section of Figure 1 taken along the line 2—2 and looking in the direction of the arrows.

Figure 11 is an enlarged fragmentary view of Figure 2 illustrating the bevels on the under edges of the end member and side member of the lubricant holder; and Figure 12 is an enlarged fragmentary vertical cross-section illustrating a modified form of my invention as applied to the sliding or reciprocating contact surface of the piston rod of an engine or similar device. The upper half of the bearing block and that part of the bearing assembly not shown is essentially the same as that shown in Figure 2. The moving contact surface, however, instead of being in the form of an axle or shaft as shown in Figure 2 is rather in the form of a reciprocating contact surface such as commonly found in a valve mechanism or piston rod such as on a steam locomotive.

On the drawings the same numerals indicate the same parts throughout.

Numerous other forms of my invention may be readily suggested to the mind of the skilled mechanic or manufacturer by my herein disclosure. The scope of my invention, however, is set forth in my appended claims.

Figure 1:
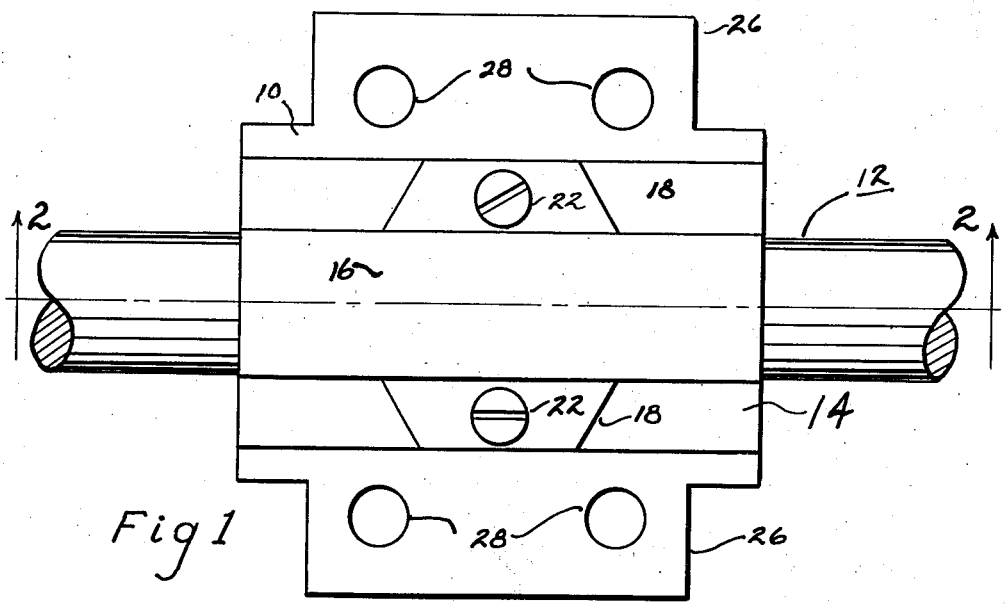
Figure 1 represents a plan view of a bearing assembly embodying my invention.

In the embodiment of my invention illustrated in Figures 1 and 2, the bearing is indicated generally at 10 and the shaft at 12. The bearing comprises a drilled block 14 of any suitable bearing material and a cover member 16 shown in perspective in Figure 5. The cover member 16 is a rectangular open box with flanges 18 integral therewith for attachment to the bearing block 14. Holes 20 are drilled through the flanges and into the block. Screws 22 may be used to fasten the cover 16 to the block 14. Disposed longitudinally in the block is a slotted opening 24 which extends from the top of the bearing block 14 down to the shaft 12 as shown in Figure 3. The bearing block 14 is also equipped with flanges 26 which are drilled with holes 28 for purposes of mounting the bearing in a suitable position. The drilled opening for the shaft 12 is indicated at 30. At both ends of the block 14 the drilled opening 30 expands into a concentric opening 32. Thus as shown in Figures 2 and 8, the bearing surface does not extend beyond the length of the longitudinal slot 24.

Within the slot 24 is disposed a lubricant holder comprising side members 34 and end members 36 which fit loosely in grooves 38 cut vertically near the ends of the sides 34. The side members 34 and the end members 36 thus define a rectangular holder when placed into position in the slot 24. It is to be noted, however, that the side members 34 of the holder can move vertically independently of the end members 36 even though said members have lateral stability. Further, each of the end members has the under edge thereof or the edges contiguous with the shaft 12 indicated by numeral 57, beveled inwardly and downwardly as shown in Figures 2 and 11, the purpose of which will be hereinafter explained.

Pure granular graphite indicated by numeral 40 or other graphite-like lubricant may be introduced within the holder so that the lubricant comes in contact with the shaft 12 as shown in Figures 2, 3 and 7.

Provided at the under top side of the cover member 16 is the curved leaf spring or tension means 42 as shown particularly in Figures 2, 3 and 5. The said leaf spring 42 is fastened in any suitable manner at the apex thereof to the top underside of the said cover member 16 by the bolt 44 disposed in the retaining member or washer 58 and screw-threadedly engaged in the cover 16. The retaining member 58 is positioned between the under top side of the cover member 16 and the said leaf spring 42 in such a manner as to separate the said leaf spring 42 from the cover 16.

The said leaf spring 42 at opposite sides of the said retaining member 58 tends to bend downwardly and upon the application of sufficient force at the ends thereof will tend to bend upwardly at either side of the fulcrum or retaining member 58.

The opposite ends of the leaf spring 42 have provided the three bent spring fingers 60, 61 and 62 formed from the leaf spring 42. The spring fingers 60 and 61 are bent downwardly at 59 so as to engage the upper edge of the opposite side members 34 respectively and to hold the said side members downwardly under spring tension in engaging relation with the relatively moving contact surface. Moreover, the spring finger 62 is sharply bent downwardly at 80 and has further provided at the lower end thereof the bent foot engagement member 46 so as to engage the upper edge of the end member 36 and to thereby hold under spring tension the end member 36 in engagement relation with the contact surface of the shaft 12. The said spring fingers 60, 61 and 62 are arranged so as to provide separate and independent tension or biasing means on the respective parts.

The apertures 48 are further provided near each end of the leaf spring 42 so positioned as to allow the pins 50 to pass freely therethrough as shown in Figures 2 and 5. The pins 50 at the upper ends thereof are screw-threadedly engaged in the cover member 16.

There is further provided a feed bar 52 apertured at each end so as to slidably engage the pins 50 as shown in Figures 2 and 5 and thereby mount the said feed bar 52 horizontally between the said pins 50.

Further mounted on the said pins 50 are the helical compression springs 54 having the upper ends thereof engaging the underside of the top cover member 16 and the lower ends engaging the said fed bar 52. As shown in Figures 2 and 5, the said springs 54 move freely in the apertures 48 of the leaf spring 42.

The springs 54 are adapted to force the feed bar 52 downwardly under spring tension so as to maintain a feeding pressure in the lubricating material 40 held in the holder assembly, side members 34 and end members 36.

It will be readily seen that separate independent spring tension means are provided for holding the lubricant 40 against the shaft 12. Further independent tension means are provided for forcing each of the side members 34 downwardly and for forcing each of the end members 36 against the shaft 12.

Referring to Figure 7, it will be noted that the inner edge 63 of the side members 34 and the lower edge 64 of the said members form a right angled bevel so as to present substantially a line edge 56 to the shaft 12. This line edge 56 extends completely across the bearing surface.

In operation it will be seen that if the shaft or axle 12, Figure 7, is rotating in a clockwise direction the excess particles of lubricant on the shaft will tend to pass under the lower edge 64 of the independently mounted holder side member 34 at the left or the leading side wall and such excess lubricant will be scraped off or retained by the line edge 56 of the holder side member 34 at the right or the trailing side wall. If the rotation of the bearing be reversed the previous leading wall will become the trailing wall, and the previous trailing wall will become the leading wall which members will function as explained.

The effect produced through my invention as previously explained is due, it is believed, to several factors. First, it will be noted that the lower edge of the leading side wall forms an angle with the contact surface of the shaft 12 which is considerably less than the angle formed by the inner side wall 63 of the trailing side member with such surface. Since the angle at the trailing side wall is greater, the resistance afforded by this wall to the excess particles of lubricant would be greater thereby causing a scraping effect on the excess lubricant on the relatively moving contact surface.

Although the angle formed by the leading side wall lower edge 64 with the contact surface or shaft 12 and the angle formed with such contact surface by the inner wall 63 of the trailing wall does not appear critical, the first angle should obviously be such that excess particles of lubricant will pass under the holder edge 56 of the leading wall, while the second angle of the trailing wall should be such as to afford substantial resistance to the excess lubricant.

In theory it would seem that the smaller the angle formed by the lower edge of the leading wall, the less the resistance which the excess particles of lubricant would meet. The minuteness of such angle would of course be limited by the point where the line edge formed at 56 would disappear or the point where a binding effect would take place. In theory also it would seem that within proper limits the greater the angle formed by the inner edge 63 of the trailing wall with the contact surface or shaft, the greater the resistance which would be encountered by the excess particles of lubricant and accordingly the greater the scraping effect which would result.

A further factor enters into the cause of the effectiveness of my invention in that as the excess lubricant strikes the lower edge 64 of the leading edge, it will tend to force this wall against spring tension upwardly by exerting a force against the lower edge 64 and thereby forcing its way under the lower edge 64 and the line edge 56 of the leading wall. However, upon striking the inner edge 63 and the line edge 56 of the trailing wall, the excess lubricant will tend to force the trailing wall downwardly against the shaft 12 increasing the scraping effect thereon and tending to scrape such excess lubricant from the shaft.

Further, due to the very small area of the line edge 56, a relatively small total pressure on the sides may produce an enormous pressure per inch between the holder edge 56 and the shaft 12 exceeding, it is believed, the maximum pressure per unit area between the shaft and bearing at any other particular spot. The net effect seems to be a selective scraping of areas on the shaft which begin to build up with lubricant. Such scraping action does not remove all the lubricant but just removes the troublesome excess. The remaining lubricant acquires a high burnished appearance of excellent lubricating qualities. It does not appear necessary to scrape both the surfaces of the shaft and of the bearing—either one is sufficient. Probably any incipient build-up of lubricant on the bearing surface wears back onto the scraped surface of the shaft.

It should be further noted that, as previously observed, the holder side members 34, the end members 36 and the contained lubricant are independently biased against the shaft 12. Thus the pressure upon the holder side members 34 and end members 36 remains substantially the same regardless of the position of the feeder bar 52. The relative pressures on the lubricant 49 and on the holder side members 34 and end members 36 may be varied, to a considerable degree, but it is not necessary that the pressure on the lubricant be sufficient to force the lubricant under the holder sides, raising the sides. It appears that the relatively moving surface of the shaft 12 will pick up sufficient lubricant without forcing the feed in the above manner.

Moreover, it will be noted that there is substantially no contact between the holder and the shaft 12 beyond the lubricant. Therefore, the contacting ends of the end members 36 have been beveled downwardly and inwardly towards the holder. The end members are preferably made of a suitable flexible material so that the beveled edge 57 under spring tension of the spring fingers 62 tend to make a tight line contact between the shaft 12 which wears into a close fit as shown in Figure 8, thereby preventing the unnecessary loss of the lubricant. Further at both ends of the block 14, the opening 30 expands into a concentric opening 32 so that there will be no contacting moving surfaces beyond the bearing surface. The bearing surface does not extend beyond the length of the longitudinal slot 24.

Furthermore, the ends of the side members 34 extending beyond the bearing surface are beveled at 65 as shown in Figures 8 and 11, so as not to have contact with the shaft 12 beyond the bearing surface.

In order to assure that even the line edge contact of the end members of the holder will be within the lubricated area, there are disclosed at Figures 9 and 10 two modified forms of holder structure for my invention. The bearing assembly, of course, remains substantially the same with the exceptions noted in the modified forms.

Figure 9 shows the end members 68 and 69 set at an angle to each other and at an acute angle to the side members whereby with the longer side line edge as the trailing edge, distribution of the lubricant of sufficient width will result for the beveled edges of both end members.

In Figure 10, the end members 66 and 67, while extending parallel to each other, are set at an acute angle to the side members so that regardless of the direction of rotation of the shaft, the distribution of the lubricant will be sufficiently wide so as to cover substantially the area over which the line edges of both end members 66 and 67 will travel.

The holder assemblies described herein may be mounted within the shaft if desired, and the feeding and scraping action will then take place on the bearing surface rather than on the shaft surface. The scraping action in addition to eliminating the undesirable build up of lubricant with attendant binding of the shaft, also conserves on the supply of lubricant. It thus appears possible to build a graphite lubricated bearing assembly which will run for the life of the bearing parts without further consideration to lubrication.

Further I have provided a novel means for ventilating the bearing assembly. This ventilating means consists of the helical slot or channel 81 shown in Figures 2, 3, 7 and 8, and formed in the inner bearing surface 30 of the bearing block, extending around the inner surface 30 and opening at the opposite ends of the bearing block as at 84. The helical slot 81 is also adapted to open into the slot 24 provided for the lubricant holder 34 as shown at 82 and 83. Thus the opening 84 and the openings at the opposite ends of the slot 24 as indicated at 85 and 86 form a ready passage for air to the helical slot 81, whereby the air may circulate around the bearing, preventing the over-heating thereof. If it should be desired to position the lubricant holder assembly within the shaft, as previously suggested, the helical slot could obviously be positioned in the bearing surface of the shaft.

It is to be understood, however, that my herein described invention is not limited solely to bearing assemblies comprising a bearing box and a journal but may extend to any relatively moving surfaces to be lubricated. Thus the invention has application to sliding contact surfaces such as the piston of an engine within its cylinder or valve mechanisms.

To this end, a modification of my invention is illustrated in Figure 12 as applied to a sliding piston. The numeral 70 representing the contact surface and 71 the bearing block. The upper half of the bearing block and that part of the bearing assembly not shown in Figure 12 is in all essential details the same as shown in Figures 1, 2 and 3. Like numerals indicate like parts. The disclosure illustrates the bearing at the extreme end of the sideward movement of the parts in the direction of the arrow. While the illustration shows the lubricant as applied only at one side, obviously, however, the same may be applied as desired at either or both sides and at the top and bottom. The operation of the modified form is essentially the same as previously described for the form shown in Figures 2 and 3, there being provided at the extreme ends of the contact surface 70 the recess 72 so that the surfaces 73 of the bearing block will always move on bearing surface to which the lubricant has been applied.

Thus on the return stroke or the sideward movement to the right of the bearing block 71 with relation to the contact surface 70, the side wall 74 will become the leading wall and any excess lubricant will tend to force the wall 74 upwardly and the excess lubricant passing under the lower edge 76 and will in turn be scraped by the inner wall 77 of the side wall member 75. At the extreme end of the sideward movement to the right, a similar recess is provided to that shown at 72 so that the block 71 will always slide on bearing surface. Upon the return sideward movement to the left, the procedure will of course be reversed, the side wall member 75 becoming the leading wall and the side wall member 74 then becoming the trailing wall. Since, as shown in Figure 1, the bearing is in the form of a block the portion of the block passing over the recess 72 would of course be held in place for return travel by the remaining portion of the bearing block of which it is a part, which would remain on bearing surface.

Further the invention is not limited to the use of graphite alone but extends to all flaky lubricants which hitherto have been troublesome due to caking and building up between the contact surfaces.

It will therefore be understood that the phrase "graphite-like lubricant" where employed in the claims refers not only to graphite lubricants but also to other lubricants comprising flaky or scale material such as mica and vermiculite.

Having thus described my invention, what I claim as my invention and desire to secure by Letters Patent, is:

1. A bearing assembly comprising a first surface to be lubricated, a second surface relatively movable to and in contact with said first surface, a quantity of graphite-like lubricant for lubricating said surface, means for feeding said graphite-like lubricant to said first surface, and scraper means having rigid portions engaging the first surface for scraping and retaining excess graphite-like lubricant from said first surface, and the said second surface having formed therein a channel adapted to ventilate the said contact surfaces.

2. A bearing assembly comprising a first surface to be lubricated, a second surface relatively movable to and in contact with said first surface, a quantity of graphite-like lubricant for lubricating said surface, means for biasing said graphite-like lubricant against said first surface, and line-edge means biased against said first surface for scraping and retaining excess graphite-like lubricant from said first surface.

3. A bearing assembly comprising a first surface to be lubricated, a second surface relatively movable to and in contact with said first surface, a quantity of graphite-like lubricant for lubricating said surface, means for biasing said graphite-like lubricant against said first surface, beveled means presenting a line-edge to said first surface, and means for biasing said line-edge against said first surface for scraping and retaining excess graphite-like lubricant from said first surface.

4. A bearing assembly comprising a first surface to be lubricated, a second surface relatively movable to and in contact with said first surface, a holder member, a quantity of graphite-like lubricant for lubricating said surface contained within said holder, means for biasing said graphite-like lubricant against said first surface, and means for biasing said holder against said first surface for scraping and retaining excess graphite-like lubricant from said first surface.

5. A bearing assembly comprising a first surface to be lubricated, a second surface relatively movable to and in contact with said first surface, a holder having side members, a quantity of graphite-like lubricant for lubricating said surface contained within said holder, means for biasing said graphite-like lubricant against said first surface, and means for biasing said holder side members against said first surface, said holder side members having beveled edges and presenting substantially a line edge to said first surface.

6. A bearing assembly comprising a first surface to be lubricated, a second surface relatively movable to and in contact with said first surface, a holder having side members movable vertically independently of each other, a quantity of graphite-like lubricant for lubricating said surface contained within said holder, means for biasing said graphite-like lubricant against said first surface, and means for biasing said holder side members against said first surface, said holder side members having beveled edges and presenting substantially a line-edge to said first surface for scraping and retaining excess graphite-like lubricant from said first surface.

7. A bearing assembly comprising a first surface to be lubricated, a second surface relatively movable to and in contact with said first surface, a quantity of graphite-like lubricant for lubricating said surface, means for biasing said graphite-like lubricant against said first surface, beveled means presenting a line-edge to said first surface, and means for biasing said line-edge against said first surface with a unit pressure exceeding that between any opposing portions of said first and second surfaces.

8. A bearing assembly comprising a shaft to be lubricated, a bearing box in which the shaft fits and is relatively movable, a holder member contained in said bearing box, a quantity of graphite-like lubricant for lubricating said surface contained within said holder, means for biasing said graphite-like lubricant against said shaft, and means for biasing said holder member against said shaft, the holder member having rigid end portions engaging the shaft for scraping and retaining excess graphite-like lubricant from said shaft.

9. A bearing assembly comprising a first surface to be lubricated, a second surface relatively movable to and in contact with the said first surface, graphite-like lubricant adapted to lubricate the said first and second surfaces and rigid means for scraping excess graphite-like lubricant from one of the said surfaces.

10. In a bearing assembly of the class including a first surface, a second surface relatively movable to and in contact with the said first surface, and a slot provided in the first surface; the improvement comprising side members slidably positioned in the said slot, end members slidably positioned in the said slot, the said side members and the said end members forming a holder, graphite-like lubricant disposed in the said holder, tension means provided in the said holder adapted to feed the said graphite-like lubricant to the said second surface, a leaf spring, supporting means for the said leaf spring, a plurality of spring fingers contiguous with and a part of the said leaf spring, the said spring fingers mounted at one end of the said leaf spring, the said spring fingers adapted to provide separate tension means for holding the said side members in engaging relationship with the said second surface and thereby limiting the graphite-like lubricant fed to the said second surface.

11. In a bearing assembly of the class including a first surface, a second surface relatively movable to and in contact with the said first surface, a slot provided in the said first surface opening to the said second surface; the improvement comprising side members slidably mounted in the said slot, end members slidably positioned in the said slot, the said side members and the said end members forming a holder, graphite-like lubricant for the lubrication of the said first surface and the said second surface, the said graphite-like lubricant disposed in the said holder, tension means adapted to feed the said graphite-like lubricant to the said second surface, separate tension means for holding the said side members in engaging relation with the said second surface, and additional separate tension means for holding the said end members in engaging relationship with the said second surface, limiting thereby the said graphite-like material fed to the said second surface.

12. In a bearing assembly comprising a first surface to be lubricated, a second surface relatively movable to and in contact with said first surface, a quantity of graphite-like lubricant for lubricating said surface, a holder for feeding said graphite-like lubricant to said first surface, a first member forming a line edge at one side of the said holder and a second member forming a line edge at the other side of the said holder and the said first member adapted to permit excess graphite-like material on the first surface moving in relation thereto in one direction to pass under the said first member and the second member in such event adapted to scrape the excess graphite-like lubricant from the said first surface and the second member adapted when the first surface moves in relation thereto in the opposite direction to permit the said excess graphite to pass under the said second member and the first member in such event adapted to scrape the excess graphite from the said first surface.

13. In a bearing assembly comprising a first surface to be lubricated, a second surface relatively movable to and in contact with said first surface, a quantity of graphite-like lubricant for lubricating said surface, a holder for feeding said graphite-like lubricant to said first surface, a first member mounted at one side of the said holder and a second member mounted at the other side of the said holder and the said first member having a face forming an angle with the said first surface and the second member having a face forming an angle with the said first surface, the angle formed with the said first surface by the face of the said first member being substantially less than the angle formed by the said face of the second member, whereby the said face of the first member is adapted to permit the substantially unobstructed passage of excess lubricant approaching the said face of the first member through relative movement of the said first surface, and the face aforesaid of the second member being adapted to substantially suppress and scrape from the said first surface the excess lubricant which may approach such second face upon such relative movement of the said first surface.

14. In a bearing assembly comprising a first surface to be lubricated, a second surface relatively movable to and in contact with said first surface, a quantity of graphite-like lubricant adapted to lubricate the first surface, a member forming substantially a line edge engaging the said first surface, biasing means for the said member whereby the said line edge of the said member engages the said first surface at a pressure exceeding the maximum pressure per unit area between the said first surface and the said second surface at any other point.

15. In a bearing assembly comprising a first surface, a second surface relatively movable to and in contact with the said first surface, graphite-like lubricant adapted to lubricate the said surfaces, a first member having a face forming an angle with the said first surface, a second member having a face forming an angle with the said first surface, the angle formed with the said first surface by the face of the said first member being substantially less than the angle formed by the said face of the second member, whereby the said face of the first member is adapted to permit the substantial unobstructed passage of excess lubricant carried on the said first surface when approaching the said face of the first member and whereby the face aforesaid of the said second member is adapted to scrape such excess lubricant from the said first surface, biasing means adapted to hold under tension the said faces of the said first and second members in engaging relation with the said first surface and the said faces adapted to form substantially a line edge contact with the said first surface.

WILLIAM M. ANDERSON.